United States Patent
Ding et al.

(10) Patent No.: US 10,809,834 B2
(45) Date of Patent: Oct. 20, 2020

(54) TOUCH DISPLAY PANEL, METHOD OF DRIVING TOUCH DISPLAY PANEL, AND DISPLAY APPARATUS

(71) Applicant: BOE TECHNOLOGY GROUP CO., LTD., Beijing (CN)

(72) Inventors: Xiaoliang Ding, Beijing (CN); Haisheng Wang, Beijing (CN); Chunwei Wu, Beijing (CN); Yingming Liu, Beijing (CN); Wei Liu, Beijing (CN); Pengpeng Wang, Beijing (CN); Yanling Han, Beijing (CN); Xueyou Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/326,263

(22) PCT Filed: Mar. 16, 2018

(86) PCT No.: PCT/CN2018/079227
§ 371 (c)(1),
(2) Date: Feb. 18, 2019

(87) PCT Pub. No.: WO2018/188451
PCT Pub. Date: Oct. 18, 2018

(65) Prior Publication Data
US 2019/0212856 A1    Jul. 11, 2019

(30) Foreign Application Priority Data

Apr. 12, 2017  (CN) .......................... 2017 1 0235039

(51) Int. Cl.
*G06F 3/041*    (2006.01)
*G06F 3/044*    (2006.01)
(Continued)

(52) U.S. Cl.
CPC ........ *G06F 3/0412* (2013.01); *G02F 1/13338* (2013.01); *G02F 1/133514* (2013.01);
(Continued)

(58) Field of Classification Search
CPC .. G06F 3/0412; G06F 3/0445; G06F 3/04166; G06F 3/0446; G06F 3/016;
(Continued)

(56) References Cited

U.S. PATENT DOCUMENTS 9,898,135 B2 * 2/2018 Zhang .................. G06F 3/0416
9,916,024 B2 * 3/2018 Wang ................... G06F 3/0412
(Continued)

FOREIGN PATENT DOCUMENTS

CN        101847070 A    9/2010
CN        202948433 U    5/2013
(Continued)

OTHER PUBLICATIONS

International Search Report and English Translation of Box V of the Written Opinion dated, Jun. 15, 2018, received for corresponding PCT Application No. PCT/CN2018/079227.
(Continued)

*Primary Examiner* — Carolyn R Edwards
(74) *Attorney, Agent, or Firm* — Kinney & Lange, P.A.

(57) ABSTRACT

Embodiments of the present disclosure provide a touch display panel, a method of driving the touch display panel, and a display apparatus with the touch display panel. The touch display panel includes: a common electrode layer disposed in an array substrate or a color filter substrate, configured for displaying an image, and including: a plurality of first strip-shaped electrodes each serving as a first touch feedback electrode and one of a touch drive electrode and a touch sense electrode; and a plurality of second strip-shaped electrodes crossing the first strip-shaped elec-
(Continued)

trodes, and each serving as a second touch feedback electrode; and a plurality of third strip-shaped electrodes disposed in the color filter substrate and each serving as the other of the touch drive electrode and the touch sense electrode. a An extending direction of the third strip-shaped electrodes crosses an extending direction of the first strip-shaped electrodes.

6 Claims, 3 Drawing Sheets

(51) Int. Cl.
    *G02F 1/1335*     (2006.01)
    *G02F 1/1343*     (2006.01)
    *G06F 3/01*     (2006.01)
    *G02F 1/1333*     (2006.01)

(52) U.S. Cl.
    CPC ........ *G02F 1/134336* (2013.01); *G06F 3/016* (2013.01); *G06F 3/044* (2013.01); *G06F 3/0416* (2013.01); *G06F 3/0445* (2019.05); *G06F 3/0446* (2019.05); *G06F 3/04166* (2019.05); *G02F 2201/121* (2013.01); *G02F 2201/122* (2013.01); *G06F 2203/04111* (2013.01)

(58) Field of Classification Search
    CPC ................... G06F 3/0416; G06F 3/044; G06F 2203/04111; G02F 1/13338; G02F 1/134336; G02F 1/133514; G02F 2201/121; G02F 2201/122
    See application file for complete search history.

(56) References Cited

U.S. PATENT DOCUMENTS

| | | | |
|---|---|---|---|
| 2015/0015806 A1* | 1/2015 | Wu | G06F 3/044 349/12 |
| 2016/0027356 A1* | 1/2016 | Cheng | G06F 3/0412 345/173 |
| 2016/0357342 A1* | 12/2016 | Olley | G06F 3/016 |
| 2019/0212856 A1* | 7/2019 | Ding | G06F 3/0445 |

FOREIGN PATENT DOCUMENTS

| | | |
|---|---|---|
| CN | 203882289 U | 10/2014 |
| CN | 104765519 A | 7/2015 |
| CN | 105204687 A | 12/2015 |
| CN | 105630238 A | 6/2016 |
| CN | 107422896 A | 12/2017 |

OTHER PUBLICATIONS

First Chinese Office Action dated Mar. 25, 2019, received for corresponding Chinese Application 201710235039.5.
Second Chinese Office Action dated Jul. 23, 2019, received for corresponding Chinese Application 201710235039.5.

* cited by examiner

TOUCH DISPLAY PANEL, METHOD OF DRIVING TOUCH DISPLAY PANEL, AND DISPLAY APPARATUS

CROSS-REFERENCE TO RELATED APPLICATION

This application is a Section 371 National Stage Application of International Application No. PCT/CN2018/079227, filed on Mar. 16, 2018, entitled "TOUCH DISPLAY PANEL, METHOD OF DRIVING TOUCH DISPLAY PANEL, AND DISPLAY APPARATUS", which claims priority to Chinese Application No. 201710235039.5, filed on Apr. 12, 2017, incorporated herein by reference in their entirety.

TECHNICAL FIELD

The present disclosure relates to a touch display panel, a method of driving the touch display panel, and a display apparatus.

BACKGROUND

Touch screens include an add-on type touch screen (Add on Mode Touch Panel), an on-cell type touch screen (On Cell Touch Panel), and an in-cell type touch screen (In Cell Touch Panel). In a capacitive in-cell touch screen, a touch scan line and a touch sense line are added directly on a TFT (Thin Film Transistor) array substrate to achieve a touch positioning function.

In order to improve a touch experience, a conventional touch screen also has a touch feedback function. An electrostatic touch feedback technology is most commonly used to achieve an electrostatic touch feedback by forming an electrostatic force at a finger-touched position. A conventional electrostatic touch feedback is achieved by attaching a separately manufactured electrostatic touch layer to an upper surface of a touch display apparatus. Because the electrostatic touch layer is closest to a finger, if a capacitive touch screen is used, the electrostatic touch layer will shield a capacitive touch signal to a certain degree, resulting in a poor phenomenon that a touch feedback effect is imperceptible. In addition, with the conventional electrostatic touch feedback technology, an electrical signal is applied to all of electrodes configured for a touch feedback, resulting in a high power consumption.

SUMMARY

Embodiments of the present disclosure provide a touch display panel comprising: an array substrate and a color filter substrate disposed opposite to each other; a liquid crystal layer disposed between the array substrate and the color filter substrate; a common electrode layer disposed in the array substrate or the color filter substrate and configured for displaying an image, wherein the common electrode layer comprises: a plurality of first strip-shaped electrodes each serving as a first touch feedback electrode and one of a touch drive electrode and a touch sense electrode; and a plurality of second strip-shaped electrodes crossing the plurality of first strip-shaped electrodes, insulated from the plurality of first strip-shaped electrodes, and each serving as a second touch feedback electrode; and a plurality of third strip-shaped electrodes disposed in the color filter substrate and each serving as the other of the touch drive electrode and the touch sense electrode, wherein an extending direction of the plurality of third strip-shaped electrodes crosses an extending direction of the plurality of first strip-shaped electrodes.

According to an embodiment of the present disclosure, the common electrode layer is disposed on a side of the array substrate facing towards the liquid crystal layer.

According to an embodiment of the present disclosure, the plurality of third strip-shaped electrodes are disposed on a side of the color filter substrate facing towards the liquid crystal layer.

According to an embodiment of the present disclosure, the plurality of first strip-shaped electrodes extend in a first direction, the plurality of second strip-shaped electrodes extend in a second direction, and the plurality of third strip-shaped electrodes extend in the second direction.

According to an embodiment of the present disclosure, the first direction is perpendicular to the second direction.

According to an embodiment of the present disclosure, each of the plurality of first electrodes comprises: a plurality of sub-electrodes disposed at intervals; and bridging lines connecting adjacent ones of the plurality of sub-electrodes.

According to an embodiment of the present disclosure, the sub-electrodes of the plurality of first strip-shaped electrodes are arranged in a matrix, one of the plurality of first strip-shaped electrodes is formed by connecting each column of sub-electrodes through the bridging lines, and the plurality of third strip-shaped electrodes and a plurality of rows of sub-electrodes are alternately arranged when viewed in a direction perpendicular to the common electrode layer.

According to an embodiment of the present disclosure, the plurality of third strip-shaped electrodes and the plurality of rows of sub-electrodes are alternately arranged at a predetermined interval when viewed in the direction perpendicular to the common electrode layer.

According to an embodiment of the present disclosure, the plurality of second strip-shaped electrodes and the plurality of rows of sub-electrodes are alternately arranged.

According to an embodiment of the present disclosure, the plurality of second strip-shaped electrodes and the plurality of rows of sub-electrodes are alternately arranged at a predetermined interval.

According to an embodiment of the present disclosure, the sub-electrodes each have a rectangular shape.

According to an embodiment of the present disclosure, the plurality of first strip-shaped electrodes serve as the touch drive electrodes, and the plurality of third strip-shaped electrodes serve as the touch sense electrodes.

Embodiments of the present disclosure further provide a display apparatus comprising the abovementioned touch display panel.

Embodiments of the present disclosure further provide a method of driving the abovementioned touch display panel, the method comprising: at a touch feedback stage, applying a voltage drive signal and a reverse voltage drive signal to the first electrode and the second electrode, respectively, thereby generating an electrostatic force at a touched position so as to achieve a touch feedback.

According to an embodiment of the present disclosure, the method further comprises: at a touch positioning stage, achieving a touch positioning by applying a touch drive signal to the plurality of first strip-shaped electrodes or the plurality of third strip-shaped electrodes serving as the touch drive electrodes, in cooperation with the plurality of third strip-shaped electrodes or the plurality of first strip-shaped electrodes serving as the touch sense electrodes.

According to an embodiment of the present disclosure, at the touch positioning stage, the touch positioning is achieved by applying the touch drive signal to the plurality of first strip-shaped electrodes or the plurality of third strip-shaped electrodes serving as the touch drive electrodes, in cooperation with the plurality of third strip-shaped electrodes or the plurality of first strip-shaped electrodes serving as the touch sense electrodes, thereby determining the touched position; and at the touch feedback stage, the voltage drive signal and the reverse voltage drive signal are applied to the first electrode and the second electrode corresponding to the touched position, respectively, thereby generating the electrostatic force at the touched position so as to achieve the touch feedback.

According to an embodiment of the present disclosure, at the touch positioning stage, a common voltage is applied to the plurality of second strip-shaped electrodes; and at the touch feedback stage, the plurality of third strip-shaped electrodes are set to be in a high-impedance state.

According to an embodiment of the present disclosure, the method further comprises: at a displaying stage, applying a common voltage to both the plurality of first strip-shaped electrodes and the plurality of second strip-shaped electrodes, and setting the plurality of third strip-shaped electrodes to be in a high-impedance state.

According to an embodiment of the present disclosure, the plurality of first strip-shaped electrodes serve as the touch drive electrodes, and the plurality of third strip-shaped electrodes serve as the touch sense electrodes.

BRIEF DESCRIPTION OF THE DRAWINGS

In order to describe technical solutions in embodiments of the present disclosure more clearly, accompanying drawings required for describing the embodiments will be simply explained as below. Apparently, the accompanying drawings for the following description are only some embodiments of the present disclosure. Those skilled in the art could also derive other accompanying drawings from these accompanying drawings without making a creative work.

DETAILED DESCRIPTION

In order that the object, technical solutions and advantages of the present disclosure are more apparent and more readily appreciated, the present disclosure will be further described in detail in conjunction with embodiments with reference to the accompanying drawings as below.

Embodiments of the present disclosure provide a touch display panel including: an array substrate and a color filter substrate disposed opposite to each other, a liquid crystal layer is disposed between the array substrate and the color filter substrate, and a common electrode layer is disposed in the array substrate or the color filter substrate.

The common electrode layer is divided into a plurality of first strip-shaped electrodes and a plurality of second strip-shaped electrodes crossing each other and insulated from each other. The plurality of first strip-shaped electrodes serve as touch drive electrodes and touch feedback electrodes, and the plurality of second strip-shaped electrodes serve as touch feedback electrodes. A plurality of strip-shaped touch sense electrodes are disposed on a side of the color filter substrate facing towards the liquid crystal layer, and an extending direction of the plurality of strip-shaped touch sense electrodes crosses an extending direction of the plurality of first strip-shaped electrodes.

The touch display panel according to the present embodiment can achieve a touch positioning function and a touch feedback function in operation. When a touch positioning is performed, the touch positioning function is achieved by applying a touch drive signal to the plurality of first strip-shaped electrodes serving as the touch drive electrodes, in cooperation with the plurality of strip-shaped touch sense electrodes. When a touch feedback is performed, the plurality of first strip-shaped electrodes and the plurality of second strip-shaped electrodes crossing each other and insulated from each other serve as the touch feedback electrodes together. The touch feedback function is achieved by applying touch feedback drive signals to the plurality of first strip-shaped electrodes and the plurality of second strip-shaped electrodes, respectively, to form an electrostatic force at a touched position.

Figure 1:
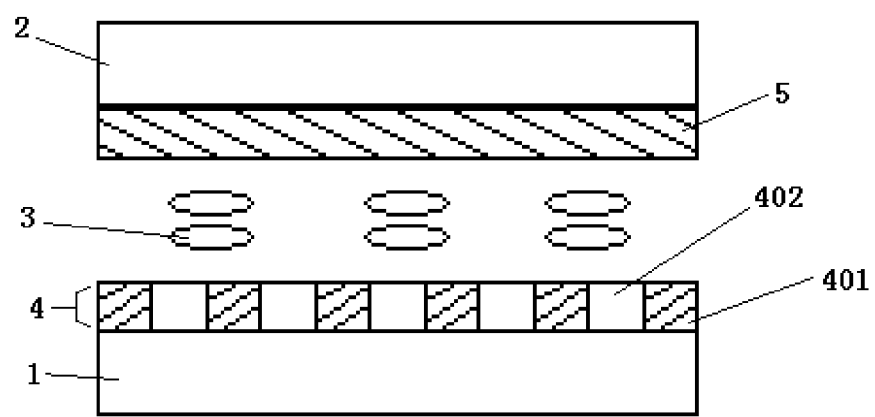
FIG. 1 is a schematic sectional view of a touch display panel according to an embodiment of the present disclosure.

FIG. 1 is a schematic sectional view of a touch display panel according to an embodiment of the present disclosure.

The touch display panel includes: an array substrate 1 and a color filter substrate 2 disposed opposite to each other, a liquid crystal layer 3 disposed between the array substrate 1 and the color filter substrate 2; a common electrode layer 4 disposed in the array substrate 1 or the color filter substrate 2, configured for displaying an image, and including: a plurality of first strip-shaped electrodes 401 each serving as a first touch feedback electrode and one of a touch drive electrode and a touch sense electrode; and a plurality of second strip-shaped electrodes 402 crossing the plurality of first strip-shaped electrodes 401, insulated from the plurality of first strip-shaped electrodes 401, and each serving as a second touch feedback electrode; and a plurality of third strip-shaped electrodes 5 disposed in the color filter substrate 2 and each serving as the other of the touch drive electrode and the touch sense electrode. An extending direction of the plurality of third strip-shaped electrodes 5 crosses an extending direction of the plurality of first strip-shaped electrodes 401. For example, the common electrode layer 4 is disposed on a side of the array substrate 1 facing towards the liquid crystal layer 3. For example, the plurality of third strip-shaped electrodes 5 are disposed on a side of the color filter substrate 2 facing towards the liquid crystal layer 3. The array substrate 1 may be provided with a pixel electrode configured to control a pixel unit to display an image in cooperation with the common electrode layer 4.

Figure 2:
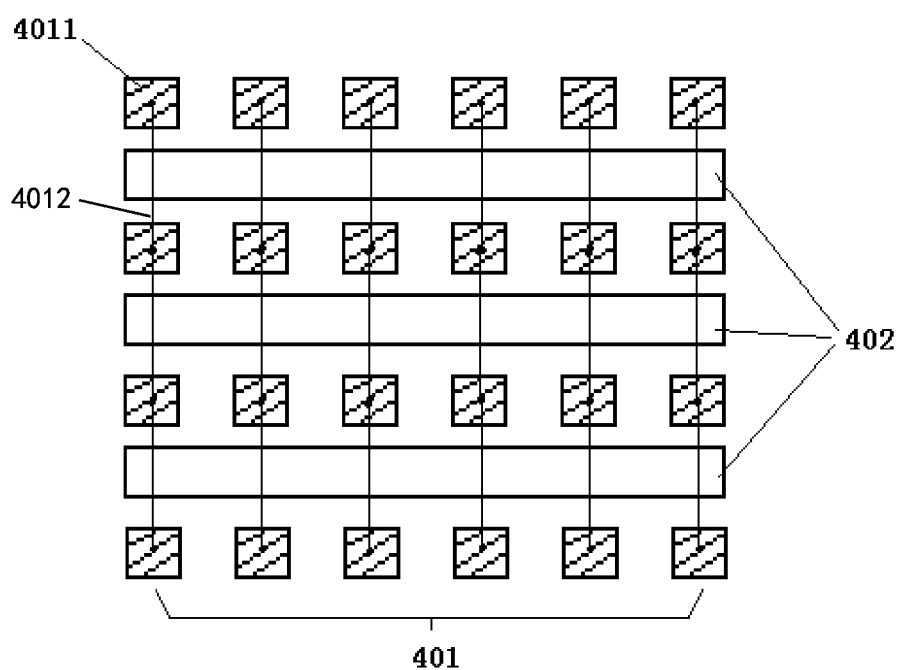
FIG. 2 is a schematic top view of a common electrode layer in the embodiment of the present disclosure.

Referring to FIG. 1 and FIG. 2, according to embodiments of the present invention, the plurality of first strip-shaped electrodes 401 serve as the touch drive electrodes, and the plurality of third strip-shaped electrodes 5 serve as the touch sense electrodes. Alternatively, the plurality of first strip-shaped electrodes 401 serve as the touch sense electrodes, and the plurality of third strip-shaped electrodes 5 serve as the touch drive electrodes.

By an electrode etching technology, the common electrode layer 4 is divided into the plurality of first strip-shaped electrodes 401 and the plurality of second strip-shaped electrodes 402 crossing each other and insulated from each other. The plurality of first strip-shaped electrodes 401 extend in a first direction (for example a vertical direction in FIG. 2), the plurality of second strip-shaped electrodes 402 extend in a second direction (for example a horizontal direction in FIG. 2), and the plurality of third strip-shaped electrodes 5 extend in the second direction. The first direction may be perpendicular to the second direction.

Figure 3:
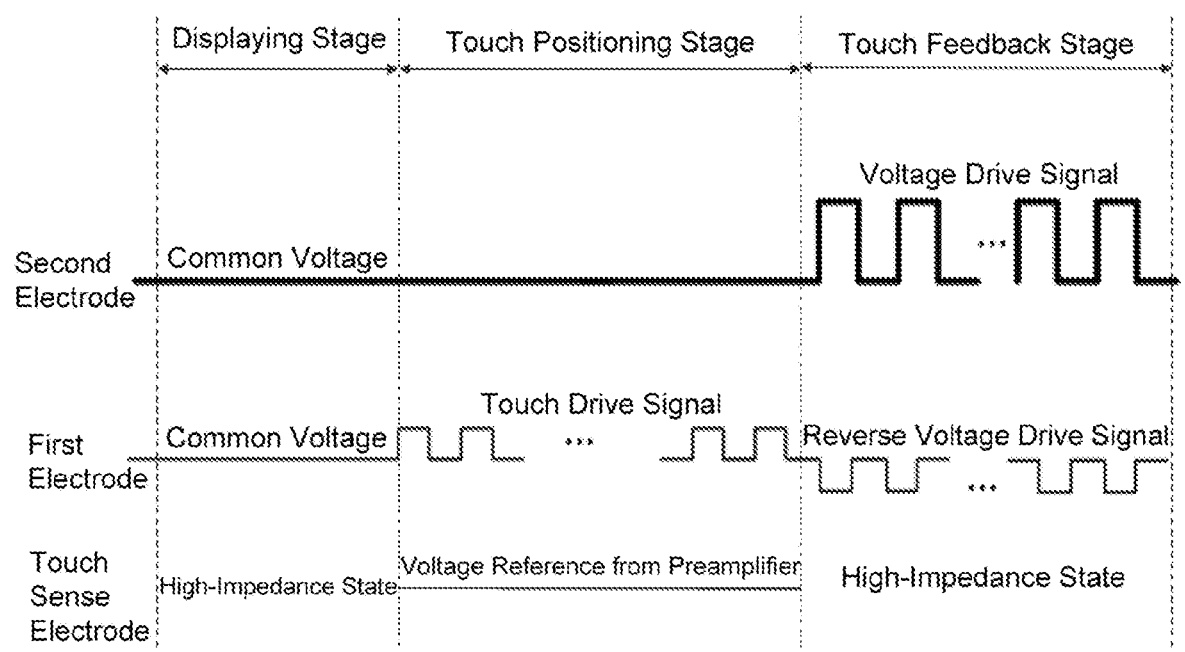
FIG. 3 is a timing diagram of drive signals in a driving method according to an embodiment of the present disclosure.

Referring to FIGS. 1 to 3, according to embodiments of the present invention, the plurality of first strip-shaped electrodes 401 are configured to be used for displaying an image at a displaying stage, to serve as the touch drive electrodes or the touch sense electrodes at a touch positioning stage, and to serve as the first touch feedback electrodes at a touch feedback stage; and the plurality of second strip-shaped electrodes 402 are configured to be used for displaying the image at the displaying stage, and to serve as the second touch feedback electrodes at the touch feedback stage.

According to embodiments of the present invention, referring to FIG. 2, each of the plurality of first strip-shaped electrodes 401 includes: a plurality of sub-electrodes 4011 arranged at equal intervals in the first direction; and bridging lines 4012 connecting adjacent ones of the plurality of sub-electrodes 4011.

Referring to FIG. 1 and FIG. 2, according to embodiments of the present invention, the sub-electrodes 4011 of the plurality of first strip-shaped electrodes 401 are arranged in a matrix, one of the plurality of first strip-shaped electrodes 401 is formed by connecting each column of sub-electrodes 4011 through the bridging lines 4012, and the plurality of third strip-shaped electrodes 5 and a plurality of rows of sub-electrodes 4011 are alternately arranged when viewed in a direction perpendicular to the common electrode layer 4. For example, the plurality of third strip-shaped electrodes 5 and the plurality of rows of sub-electrodes 4011 are alternately arranged at a predetermined interval when viewed in the direction perpendicular to the common electrode layer 4. The plurality of second strip-shaped electrodes 402 and the plurality of rows of sub-electrodes 4011 are alternately arranged. For example, the plurality of second strip-shaped electrodes 402 and the plurality of rows of sub-electrodes 4011 are alternately arranged at a predetermined interval.

When the touch positioning is performed, the plurality of first strip-shaped electrodes 401 along the first direction and the plurality of third strip-shaped electrodes 5 along the second direction are configured to be used for a touch positioning. The touch positioning function is achieved by applying a touch drive signal to the plurality of first strip-shaped electrodes 401 serving as the touch drive electrodes, in cooperation with the plurality of third strip-shaped electrodes 5 serving as the touch sense electrodes. Alternatively, the touch positioning function is achieved by applying the touch drive signal to the plurality of third strip-shaped electrodes 5 serving as the touch drive electrodes, in cooperation with the plurality of first strip-shaped electrodes 401 serving as the touch sense electrodes. In addition, when the touch positioning is performed, an overlap area between the first electrodes 401 and the third electrodes 5 can be reduced based on a structure in which the first electrodes 401 are formed by connecting the sub-electrodes 4011 through the bridging lines, thereby effectively reducing a mutual capacitance and thus facilitating a detection of a touched position.

Referring to FIG. 1 and FIG. 2, according to embodiments of the present invention, the common electrode layer 4 may not include the plurality of second strip-shaped electrodes. In this case, the sub-electrodes 4011 of the plurality of first strip-shaped electrodes 401 are arranged in a matrix, one of the plurality of first strip-shaped electrodes 401 is formed by connecting each column of sub-electrodes 4011 through the bridging lines 4012, and the plurality of third strip-shaped electrodes 5 and a plurality of rows of sub-electrodes 4011 are alternately arranged when viewed in a direction perpendicular to the common electrode layer 4. The plurality of third strip-shaped electrodes 5 and the plurality of rows of sub-electrodes 4011 are alternately arranged at a predetermined interval when viewed in the direction perpendicular to the common electrode layer 4. The plurality of first strip-shaped electrodes 401 are configured to be used for displaying an image at the displaying stage, and to serve as the touch drive electrodes or the touch sense electrodes at the touch positioning stage.

Referring to FIG. 2, according to embodiments of the present invention, each of the sub-electrodes 4011 may have a rectangular shape, a square shape, or the like.

When the touch feedback is performed, the plurality of first strip-shaped electrodes 401 along the first direction and the plurality of second strip-shaped electrodes 402 along the second direction serve as the first touch feedback electrodes and the second touch feedback electrodes, respectively. The touch feedback function is achieved by applying a voltage drive signal and a reverse voltage drive signal, i.e. touch feedback drive signals between which there is a phase difference of 180 degrees, to the plurality of first strip-shaped electrodes 401 and the plurality of second strip-shaped electrodes 402, respectively, to form the electrostatic force at the touched position.

In some optional embodiments, the common electrode layer may also be disposed on a side of the color filter substrate facing towards the liquid crystal layer. Specifically, the plurality of third strip-shaped electrodes and the common electrode layer are disposed in sequence on the side of the color filter substrate facing towards the liquid crystal layer, and an insulating layer is disposed between the plurality of third strip-shaped electrodes and the common electrode layer.

As can be seen from the above embodiments of the touch display panel, in the touch display panel according to the embodiments of the present disclosure, a common electrode layer of a conventional touch display panel is effectively utilized. The common electrode layer is divided into the first electrodes and the second electrodes. The first electrodes serve as the touch drive electrodes or the touch sense electrodes and the first touch feedback electrodes respectively configured for achieving the touch positioning function and the touch feedback function, thereby achieving a simplification of a structure of the touch display panel and improving touch feedback effects.

Accordingly, embodiments of the present disclosure further provide a method of driving the touch display panel according to the above embodiments. FIG. 3 is a timing diagram of drive signals in a driving method according to an embodiment of the present disclosure.

A period of time for which each frame is displayed on the touch display panel is divided into a displaying stage, a touch positioning stage and a touch feedback stage. A specific length of time occupied by each of the displaying stage, the touch positioning stage and the touch feedback stage may be flexibly set according to requirements in an actual application, and is not specifically limited in the present embodiment.

At the displaying stage, a common voltage is applied to both the plurality of first strip-shaped electrodes and the plurality of second strip-shaped electrodes, and the plurality of third strip-shaped electrodes are set to be in a high-impedance state (generally the third strip-shaped electrode has an impedance greater than 1000 ohm). In this stage, the touch display panel achieves an image displaying function through pixel units.

At the touch positioning stage, a touch positioning is achieved by applying a touch drive signal to the plurality of first strip-shaped electrodes or the plurality of third strip-shaped electrodes serving as the touch drive electrodes, in cooperation with the plurality of third strip-shaped electrodes or the plurality of first strip-shaped electrodes serving as the touch sense electrodes. Specifically, a voltage reference from a preamplifier is applied to the touch sense electrodes, and a voltage signal of the touch drive signal is coupled to and outputted from the touch sense electrodes. An induced capacitance between two electrodes at the touched position is changed by a touch operation of a finger of a user, so that a magnitude of the voltage signal received by the touch sense electrode is changed, thereby achieving the touch positioning function. The common voltage is applied to the plurality of second strip-shaped electrodes so that the plurality of second strip-shaped electrodes cooperate to achieve the touch positioning.

At the touch feedback stage, a voltage drive signal and a reverse voltage drive signal are applied to the first electrode and the second electrode, respectively. Specifically, the voltage drive signal is applied to the plurality of second strip-shaped electrodes, while the reverse voltage drive signal is applied to the plurality of first strip-shaped electrodes (apparently, the touch feedback drive signals applied to the first electrodes and the second electrodes may be exchanged). The touch feedback drive signals between which there is a phase difference of 180 degrees can form the electrostatic force at a position touched by a finger of a user, to achieve the touch feedback function. The plurality of third strip-shaped electrodes are set to be in a high-impedance state so that the touch feedback drive signals can pass through the plurality of third strip-shaped electrodes.

As can be seen from the above embodiments of the driving method, in the method of driving the touch display panel according to the embodiments of the present disclosure, the first electrodes, the second electrodes and the third electrodes are driven to achieve the displaying function, the touch positioning function and the touch feedback function at the displaying stage, the touch positioning stage and the touch feedback stage, respectively. When the touch feedback is performed, the touch feedback drive signals between which there is a phase difference of 180 degrees can more easily generate a stronger electrostatic force to further improve a touch feedback experience of an operator, compared with a common differential frequency touch feedback drive signals.

According to an example of the present disclosure, at the touch positioning stage, the touch positioning is achieved by applying the touch drive signal to the plurality of first strip-shaped electrodes or the plurality of third strip-shaped electrodes serving as the touch drive electrodes, in cooperation with the plurality of third strip-shaped electrodes or the plurality of first strip-shaped electrodes serving as the touch sense electrodes, thereby determining the touched position. Accordingly, at the touch feedback stage, the voltage drive signal and the reverse voltage drive signal are applied only to the first electrode and the second electrode corresponding to the touched position, respectively, to generate the electrostatic force at the touched position, thereby achieving the touch feedback at the touched position. In the present embodiment, the touch feedback drive signals are applied only to the first electrode and the second electrode located in the touched position determined in the touch positioning stage, to achieve the touch feedback, thereby remarkably reducing a power consumption.

Based on the same disclosed concept, embodiments of the present disclosure also provide a display apparatus having the touch display panel according to the above embodiments of the present disclosure. The display apparatus may include any products or parts having a displaying function, such as a mobile phone, a tablet computer, a TV, a display, a notebook computer, a digital frame, and a navigator. Other indispensable components of the display apparatus will be understood by those skilled in the art, are no longer described herein for the sake of brevity, and should not be construed to limit the present disclosure. The above embodiments of the touch display panel may be referred to for implementations and technical effects of the display apparatus and repeated contents are no longer described for the sake of brevity.

As can be seen from the above embodiments, in the touch display panel, the method of driving the touch display panel, and the display apparatus according to the present disclosure, the common electrode layer is divided into the plurality of first strip-shaped electrodes and the plurality of second strip-shaped electrodes. The plurality of first strip-shaped electrodes serve as the touch drive electrodes or the touch sense electrodes and the first touch feedback electrodes, and the plurality of second strip-shaped electrodes serve as the second touch feedback electrodes. The first electrodes and the plurality of third strip-shaped electrodes on the color filter substrate cooperate to achieve the touch positioning, while the first electrodes and the second electrodes, serving as the first touch feedback electrodes and the second touch feedback electrodes respectively, cooperate to achieve the touch feedback. In structure, an electrostatic touch layer attached to an upper surface (on a side facing away from a liquid crystal layer) of a conventional touch display apparatus is no longer needed, and a conventional electrode of the touch display apparatus is effectively utilized, thereby achieve a structural simplification. In addition, a situation where the electrostatic touch layer shields a capacitive touch signal will not occur, so that a touch feedback effect is more perceptible. In addition, the voltage drive signals between which there is a phase difference of 180 degrees can generate a stronger electrostatic force to further improve a touch feedback experience of an operator.

While the embodiments of the present invention has been shown and described, it will be understood by those skilled in the art that various changes, modifications, substitutions and alterations may be made on these embodiments without departing from the principles and spirit of the present invention, the scope of which is defined in the appended claims and their equivalents.

What is claimed is:

1. A method of driving a touch display panel, the touch display panel comprising:
   an array substrate and a color filter substrate disposed opposite to each other;
   a liquid crystal layer disposed between the array substrate and the color filter substrate;
   a common electrode layer disposed in the array substrate or the color filter substrate and configured for displaying an image, wherein the common electrode layer comprises:
      a plurality of first strip-shaped electrodes each serving as a first touch feedback electrode and one of a touch drive electrode and a touch sense electrode; and
      a plurality of second strip-shaped electrodes crossing the plurality of first strip-shaped electrodes, insulated from the plurality of first strip-shaped electrodes, and each serving as a second touch feedback electrode; and
   a plurality of third strip-shaped electrodes disposed in the color filter substrate and each serving as the other of the touch drive electrode and the touch sense electrode, wherein an extending direction of the plurality of third strip-shaped electrodes crosses an extending direction of the plurality of first strip-shaped electrodes, the method comprising:

at a touch feedback stage, applying a voltage drive signal and a reverse voltage drive signal to at least one of the plurality of first strip-shaped electrodes and at least one of the plurality of second strip-shaped electrodes, respectively, thereby generating an electrostatic force at a touched position so as to achieve a touch feedback.

2. The method of claim 1, further comprising:

at a touch positioning stage, achieving a touch positioning by applying a touch drive signal to the plurality of first strip-shaped electrodes or the plurality of third strip-shaped electrodes serving as the touch drive electrodes, in cooperation with the plurality of third strip-shaped electrodes or the plurality of first strip-shaped electrodes serving as the touch sense electrodes.

3. The method of claim 2, wherein:

at the touch positioning stage, the touch positioning is achieved by applying the touch drive signal to the plurality of first strip-shaped electrodes or the plurality of third strip-shaped electrodes serving as the touch drive electrodes, in cooperation with the plurality of third strip-shaped electrodes or the plurality of first strip-shaped electrodes serving as the touch sense electrodes, thereby determining the touched position; and at the touch feedback stage, the voltage drive signal and the reverse voltage drive signal are applied to at least one of the plurality of first strip-shaped electrodes and the second electrode corresponding to the touched position, respectively, thereby generating the electrostatic force at the touched position so as to achieve the touch feedback.

4. The method of claim 2, wherein:

at the touch positioning stage, a common voltage is applied to the plurality of second strip-shaped electrodes; and at the touch feedback stage, the plurality of third strip-shaped electrodes are set to be in a high-impedance state.

5. The method of claim 1, further comprising:

at a displaying stage, applying a common voltage to both the plurality of first strip-shaped electrodes and the plurality of second strip-shaped electrodes, and setting the plurality of third strip-shaped electrodes to be in a high-impedance state.

6. The method of claim 1, wherein:

the plurality of first strip-shaped electrodes serve as the touch drive electrodes, and the plurality of third strip-shaped electrodes serve as the touch sense electrodes.

\* \* \* \* \*